(12) United States Patent
Zecha

(10) Patent No.: US 7,036,846 B2
(45) Date of Patent: May 2, 2006

(54) DEVICE COMPRISING GAS CUSHION, IN PARTICULAR FOR A MOTOR VEHICLE

(75) Inventor: Stephan Zecha, Hösbach (DE)

(73) Assignee: Siemens Aktiengellschaft, Munich (DE)

(*) Notice: Subject to any disclaimer, the term of this patent is extended or adjusted under 35 U.S.C. 154(b) by 187 days.

(21) Appl. No.: 10/451,987

(22) PCT Filed: Oct. 7, 2002

(86) PCT No.: PCT/DE02/03787

§ 371 (c)(1),
(2), (4) Date: Jun. 27, 2003

(87) PCT Pub. No.: WO03/039918

PCT Pub. Date: May 15, 2003

(65) Prior Publication Data

US 2004/0183277 A1  Sep. 23, 2004

(30) Foreign Application Priority Data

Oct. 30, 2001  (DE) .................... 101 53 503

(51) Int. Cl.
*B60R 21/32* (2006.01)
(52) U.S. Cl. ........................................ 280/735
(58) Field of Classification Search ............ 280/728.1, 280/734, 735, 739, 743.1; 701/45–47; B60R 21/01, B60R 21/32
See application file for complete search history.

(56) References Cited

U.S. PATENT DOCUMENTS

| | | | | |
|---|---|---|---|---|
| 5,411,289 A | * | 5/1995 | Smith et al. ................. | 280/735 |
| 5,413,378 A | * | 5/1995 | Steffens et al. .............. | 280/735 |
| 5,904,368 A | * | 5/1999 | Blackburn et al. .......... | 280/735 |
| 5,957,490 A | * | 9/1999 | Sinnhuber .................... | 280/735 |
| 6,142,513 A | * | 11/2000 | Schoos et al. .............. | 280/735 |
| 6,164,694 A | * | 12/2000 | Yoshida et al. ............. | 280/736 |
| 6,189,928 B1 | * | 2/2001 | Sommer et al. .......... | 280/743.2 |
| 6,206,416 B1 | * | 3/2001 | Faigle et al. ................. | 280/735 |
| 6,220,627 B1 | * | 4/2001 | Stanley ....................... | 280/735 |
| 6,260,879 B1 | * | 7/2001 | Stanley ....................... | 280/735 |
| 6,308,983 B1 | * | 10/2001 | Sinnhuber .................... | 280/735 |
| 6,520,535 B1 | * | 2/2003 | Stanley et al. .............. | 280/735 |
| 6,520,537 B1 | * | 2/2003 | Thomas et al. ............. | 280/735 |

FOREIGN PATENT DOCUMENTS

| | | | |
|---|---|---|---|
| DE | 10001086 A1 | * | 5/2001 |
| WO | WO 200056577 A1 | * | 9/2000 |

* cited by examiner

Primary Examiner—Paul N. Dickson
Assistant Examiner—Laura B. Rosenberg
(74) Attorney, Agent, or Firm—Morrison & Foerster LLP

(57) ABSTRACT

A device comprises a gas cushion inflatable with gas by a filling device, a transceiver for electromagnetic waves, an evaluation device connected to the transceiver, and an interrogation unit, disposed on the gas cushion, that can be remotely interrogated by the transceiver to provide a degree of deployment and/or deployment velocity of the gas cushion to the evaluation device. The interrogation unit can be implemented by a transponder or a polarizing reflector.

2 Claims, 1 Drawing Sheet

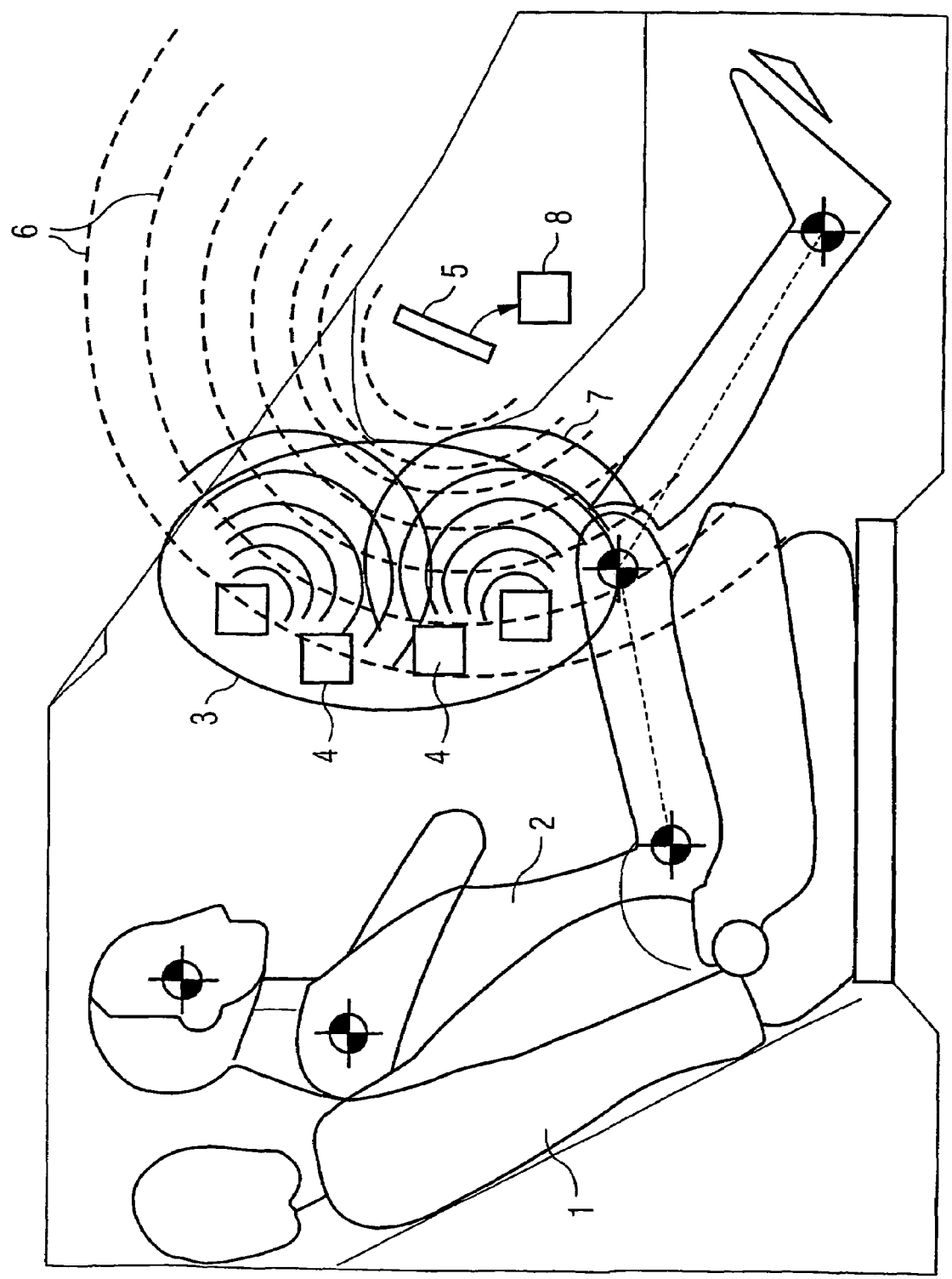

US 7,036,846 B2

DEVICE COMPRISING GAS CUSHION, IN PARTICULAR FOR A MOTOR VEHICLE

CLAIM FOR PRIORITY

This application claims priority to International Application No. PCT/DE02/03787 which was published in the German language on May 15, 2003.

TECHNICAL FIELD OF THE INVENTION

The present invention relates to a device having a gas cushion, and in particular, to a gas cushion for a motor vehicle.

BACKGROUND OF THE INVENTION

The deployment behavior of a gas cushion in a motor vehicle is usually designed to cover a situation in which the vehicle driver or a passenger is held by the safety belt with their back against the backrest of the seat, in other words is at a certain distance from the gas cushion deploying in a collision situation and usually falls forward into the already inflated gas cushion. It can, however, happen that the driver or a passenger is actually leaning forward at the time a collision situation occurs and, as a result, is hit by the deploying gas cushion. This so-called "Out-of-Position" (OoP) situation has already led to more serious injuries than would have resulted due to the actual collision alone without the gas cushion. Consequently, concepts have already been developed which detect the deployment behavior of the gas cushion and in the event of an obstacle being present in the deployment range of the gas cushion which leads to a reduced or even inhibited deployment prevent further inflation of the gas cushion.

A device in which the gas cushion is provided with interrogation units which are implemented as threads or tapes and comprise a scannable coding is disclose in European Application No. EP 0 812 741 A1. When the gas cushion is deployed, the threads or tapes are drawn along at the velocity of the front part of the gas cushion and stretch to a corresponding length in the interior of the gas cushion. An evaluation device scans the coding either mechanically or also capacitatively, inductively, optically or the like. In this way, it can determine whether there is an obstacle in the deployment range of the gas cushion. If such an obstacle is detected, the gas supply is reduced or stopped altogether in order to avoid an injury to a person forming the obstacle.

However, problems with the known device are a complicated and therefore expensive manufacturing process and unsatisfactory reproducibility of the measurement result.

SUMMARY OF THE INVENTION

The present invention relates to a device, such as a gas cushion (e.g. air bag) for a motor vehicle.

In one embodiment of the invention, there is a device having a gas cushion which can be inflated with gas by means of a filling device, as well as a transceiver for electromagnetic waves and an evaluation device connected to this transceiver, wherein there is disposed on the gas cushion at least one interrogation unit which can be interrogated in a contactless manner by the transceiver and as a result information about the degree of deployment and/or the deployment velocity of the gas cushion is provided in the evaluation device. In one aspect of the invention, there is an interrogation unit implemented by means of a reflector.

In another aspect, the reflector is a polarizing reflector.

In still another aspect, there is an interrogation unit implemented by means of a transponder.

In yet another aspect, there is a transponder implemented by means of a logic circuit which enables an encoded wave to be transmitted back to the transceiver.

BRIEF DESCRIPTION OF THE DRAWINGS

The invention is explained in more detail below in the Figure with reference to an exemplary embodiment, in which:

FIG. 1 shows a schematic cross-sectional representation of a vehicle cockpit with a seat and a person sitting on the seat.

DETAILED DESCRIPTION OF THE INVENTION

FIG. 1 shows a schematic cross-sectional representation of a vehicle cockpit with a seat 1 and a person 2 sitting on the seat. An inflated gas cushion 3 is realized with a plurality of interrogation units 4 which can be implemented as simple reflectors or as transponders. Information on suitable transponders can be found at the Internet site "http://rapidttp-.com/transponder/". A transceiver 5 which is connected to an evaluation device (8) transmits electromagnetic waves 6 to the interrogation units 4. These send back suitably coded waves 7 which are received by the transceiver 5 and processed by the evaluation device (8).

According to one embodiment of the invention, there is a transceiver for transmitting and receiving electromagnetic waves which is preferably disposed in the dashboard of a vehicle having the device. The transceiver transmits electromagnetic waves to one or more interrogation units disposed on the gas cushion which in turn send back a wave identifying a particular interrogation unit, the wave being received by the transceiver and processed and evaluated by an evaluation device connected to the transceiver in order to be able to effect an appropriate response to the deployment behavior of the gas cushion.

In contrast to the prior art, the interrogation units can therefore be interrogated in a contactless manner, thus removing the need for complicated mechanics. The deployment velocity can be determined in a relatively simple and yet precise and very easily reproducible way from the Doppler shift of the waves coming from the interrogation units.

In a first embodiment, one interrogation unit is implemented as a simple reflector. If only one interrogation unit is present, this is entirely adequate to obtain a fully operational implementation of the invention.

With a plurality of interrogation units, it is possible to distinguish these from one another, which means that the reflectors are advantageously implemented as polarizing, preferably circularly polarizing, reflectors. If opposite polarizations are chosen, two interrogation units can already be distinguished.

In order to be able to differentiate or recognize a greater number of interrogation units it is advantageous to implement these as transponders, in other words as units which receive the wave coming from the transceiver, store at least a part of the wave's energy as power for supplying a logic circuit and return an encoded wave, i.e. a wave modulated by means of a code.

In this case, the logic circuit can be implemented in its simplest form as a switch which merely switches a transceiver antenna on or off according to a stored code. In another embodiment, however, is a more complicated logic circuit which permits a correspondingly more complicated coding. For example, the logic circuit can also be implemented by means of an oscillator which actively generates a signal which, upon excitation by a signal or wave, is transmitted back to the transceiver as a wave. In this case, each interrogation unit can transmit at a different frequency. It is similarly possible to use different modulations at the same frequency or something similar. It is important in any event that the signals of the individual interrogation units can be distinguished by the transceiver.

What is claimed is:

1. A device, comprising:
a gas cushion configured for inflation with gas by a filling device;
a transceiver for electromagnetic waves; and
an evaluation device connected to the transceiver, wherein there is disposed on the gas cushion at least one interrogation unit which can be interrogated in a contactless manner by the transceiver and information about at least one of a degree of deployment and a deployment velocity of the gas cushion is provided in the evaluation device, wherein
the interrogation unit is implemented by a polarizing reflector.

2. A device, comprising:
a gas cushion inflatable with gas by a filling device;
a transceiver for electromagnetic waves;
an evaluation device connected to the transceiver; and
an interrogation unit, disposed on the gas cushion, that can be remotely interrogated by the transceiver to provide at least one of a degree of deployment and a deployment velocity of the gas cushion to the evaluation device, wherein
the interrogation unit is implemented by a transponder, and
the transponder is implemented by a logic circuit which enables an encoded wave to be transmitted back to the transceiver.

* * * * *